(12) United States Patent
Lee

(10) Patent No.: US 6,268,938 B1
(45) Date of Patent: *Jul. 31, 2001

(54) SCANNER WITH A GROOVE IN ITS SCANNING SURFACE FOR REDUCING STICKING EFFECT

(75) Inventor: Chia-Lin Lee, Hsin-chu (TW)

(73) Assignee: Mustek Systems Inc., Hsinchu (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,968

(22) Filed: Dec. 5, 1997

(51) Int. Cl.[7] ............................ H04N 1/04; G03G 15/00; B65H 29/20
(52) U.S. Cl. .......................... 358/498; 358/496; 399/388; 271/314
(58) Field of Search ................................ 358/496, 498, 358/474, 488, 497; 399/395, 396, 388, 297, 206, 215; 271/272, 275, 314, 264, 3.14; 382/312, 315

(56) References Cited

U.S. PATENT DOCUMENTS

| | | | |
|---|---|---|---|
| 5,121,225 | * 6/1992 | Murata et al. | 358/471 |
| 5,267,058 | * 11/1993 | Sata | 358/498 |
| 5,276,536 | * 1/1994 | Hokamura | 358/498 |
| 5,280,368 | * 1/1994 | Fullerton | 358/496 |
| 5,399,850 | * 3/1995 | Nagatani et al. | 250/208.1 |
| 5,434,682 | * 7/1995 | Imamura et al. | 358/474 |
| 5,532,839 | * 7/1996 | Beikirch et al. | 358/401 |
| 6,025,936 | * 2/2000 | Ishida | 358/498 |

* cited by examiner

Primary Examiner—Madeleine Nguyen
(74) Attorney, Agent, or Firm—Winston Hsu

(57) ABSTRACT

The present invention provides a scanner having an image pickup module which comprises a transparent groove over its scanning surface for scanning a document and also reducing sticking effect when a document with viscous membrane such as a photo picture is carried through the scanning surface of the image pickup module. The scanner comprises an image pickup module and a document roller for rotatably carrying a document through the image pickup module. The image pickup module comprises a housing having a scanning surface, a light source and an elongated light sensor installed inside the housing under the scanning surface. The scanning surface has a line-shaped scanning position parallel to the light sensor. When a document is carried through the scanning position, the light reflected from the document over the scanning position will be received by the light sensor. The scanning surface comprises a groove having a transparent bottom installed at the scanning position for allowing the light reflected from the document over the scanning position to pass through so as to scan the document. When the document is carried through the groove of the scanning surface, the document will not be in contact with the bottom of the groove.

8 Claims, 4 Drawing Sheets

SCANNER WITH A GROOVE IN ITS SCANNING SURFACE FOR REDUCING STICKING EFFECT

BACKGROUND OF THE INVENTION

1. Field of the Invention

The present invention relates to a scanner, more particularly, to a scanner with a groove in its scanning surface for reducing sticking effect caused by a document with viscous membrane.

2. Description of the Prior Art

Sheet-fed scanners are frequently used for scanning small documents into computers. Please refer to FIG. 1 and FIG. 2. FIG. 1 is a perspective view of a prior art sheet-fed scanner 10. FIG. 2 is a sectional view along line 2—2 of the scanner 10 shown in FIG. 1. The scanner 10 comprises an image pickup module 12, and a cylindrical document roller 14 rotatably mounted at one side of the image pickup module 12. The image pickup module 12 comprises a housing 11, a scanning surface 16 which is a transparent glass installed at one side of the housing 11 facing the roller 14, a light source 22 which is a light emitting diode (LED), and an elongated light sensor 24. Both the light source 22 and light sensor 24 are installed below the scanning surface 16 inside the housing 11. The scanning surface 16 has a line-shaped scanning position 18 parallel to the light sensor 24. When a document 26 is carried through the scanning position 18, the light 28 emitted from the light source 22 will be reflected from the document 26 over the scanning position 18 and received by the light sensor 24. The document roller 14 is driven by a stepping motor (not shown), and is rotatably mounted against the scanning surface 16 for carrying the document 26 through the scanning position 18 backward. When the document 26 is carried through the scanning surface 16 by the roller 14 at a constant speed, the image on the document 26 will be scanned by the light sensor 24.

When a photo picture which comprises viscous membrane on the picture surface is carried through the scanning surface 16, the roller 14 will press the viscous membrane against the scanning surface 16 which may be stuck to the scanning surface. Such sticking effect will interfere with the light reflected from the photo picture and generate a blurred image in the scanned image. Moreover, the sticking effect will greatly increase the viscosity between the photo picture and the scanning surface 16 which will drag the photo picture to prevent it from moving through. Sometimes the photo picture may completely get stuck on the scanning surface 16.

SUMMARY OF THE INVENTION

It is therefore a primary objective of the present invention to provide a scanner to solve the above mentioned problems.

In a preferred embodiment, the present invention provides a scanner comprising an image pickup module, and a cylindrical document roller. The image pickup module comprises a housing having a scanning surface, a light source and an elongated light sensor installed under the scanning surface inside the housing. The scanning surface has a line-shaped scanning position parallel to the light sensor. When a document is carried through the scanning position, the light reflected from the document over the scanning position will be received by the light sensor. The document roller is rotatably mounted against the scanning surface of the image pickup module for carrying the document backward through the scanning position. The scanning surface comprises a groove having a transparent bottom installed at the scanning position for allowing the light reflected from the document over the scanning position to pass through so as to scan the document so that when the document is carried through the groove of the scanning surface, the document will not be in contact with the bottom of the groove.

It is an advantage of the present invention that the viscous membrane of a photo picture will not stick to the bottom of the groove so that the blurred image caused by the sticking effect can thus be avoided.

These and other objectives of the present invention will no doubt become obvious to those of ordinary skill in the art after reading the following detailed description of the preferred embodiment which is illustrated in the various figures and drawings.

DETAILED DESCRIPTION OF THE PREFERRED EMBODIMENT

Figure 3:
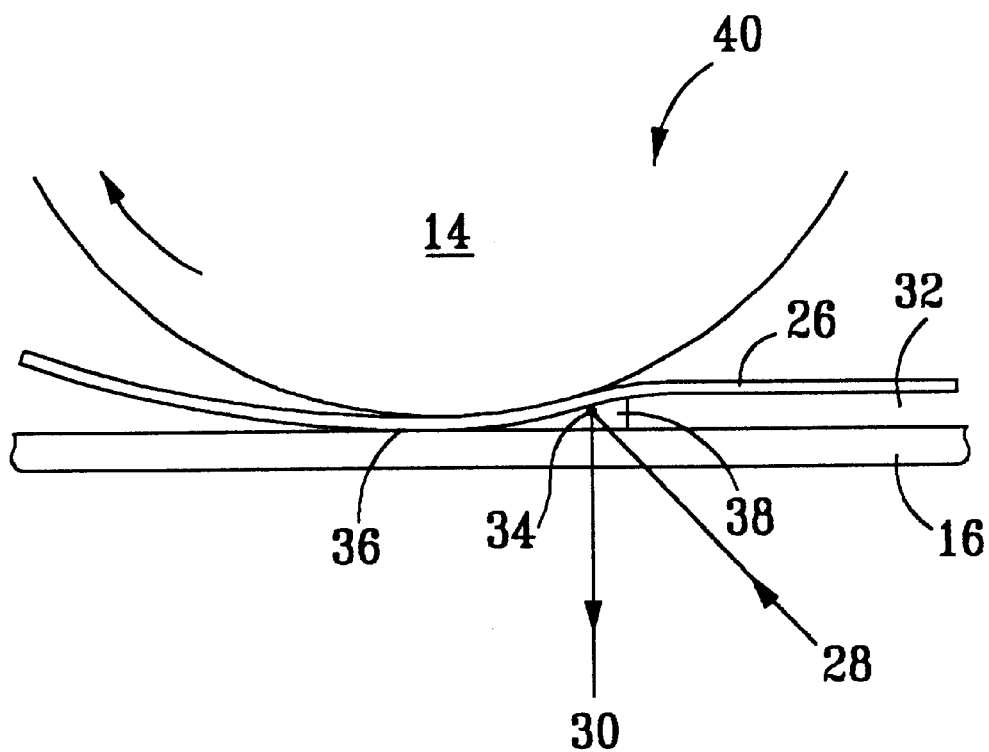
FIG. 3 is a sectional view of a scanner according to the present invention.
Figure 4:
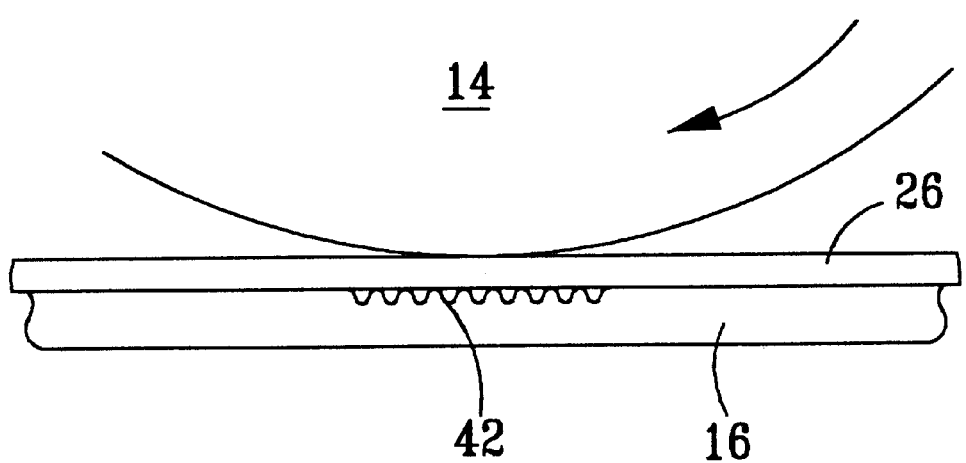
FIG. 4 is a sectional view of the scanner shown in FIG. 3 having a coarse-textured portion.

Please refer to FIG. 3 and FIG. 4. FIG. 3 is a sectional view of a scanner 40 according to the present invention. FIG. 4 is a sectional view of the scanner 40 with a coarse-textured portion 42. The scanner 40 comprises a cylindrical document roller 14 rotatably mounted on the scanning surface 16. The contacted portion 36 is the area of the scanning surface 16 in contact with the document roller 14. The roller 14 is used for carrying a document 26 backward so that a light sensor (not shown) can receive the light emitted from a light source (not shown) in direction 28 and reflected from the document 26 in direction 30.

Figure 1:
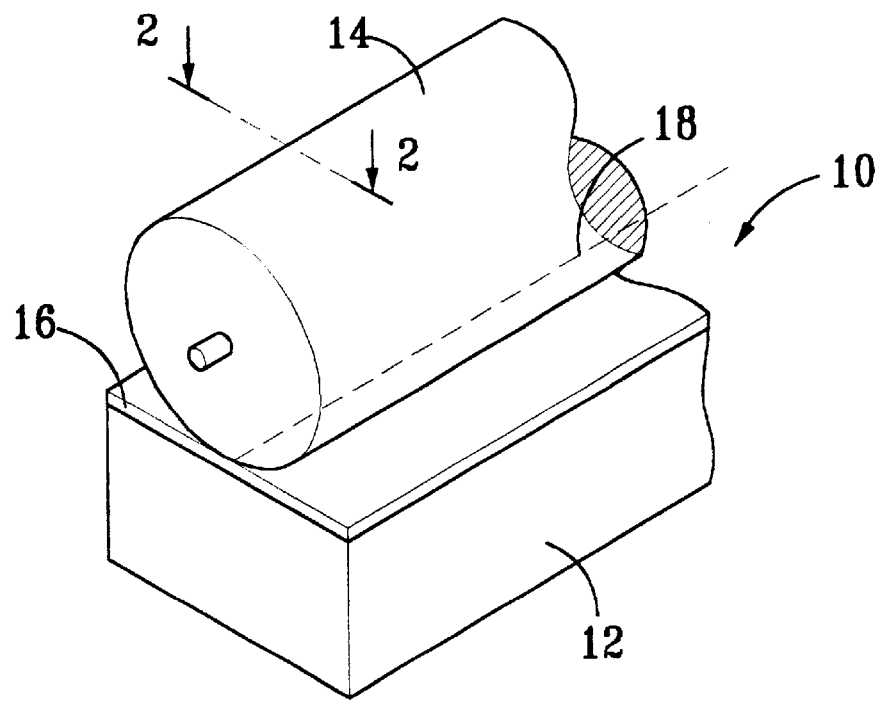
FIG. 1 is a perspective view of a prior art sheet-fed scanner 10.
Figure 2:
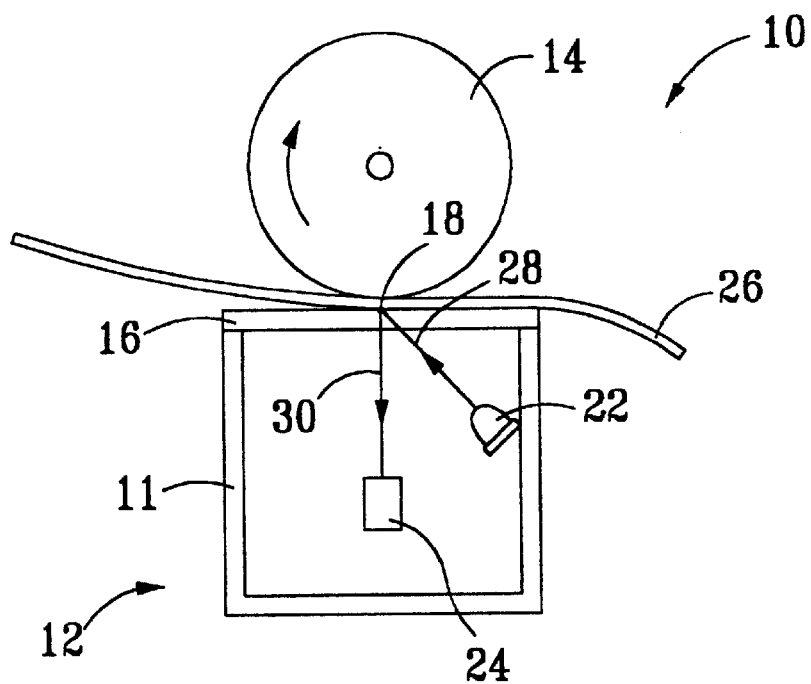
FIG. 2 is a sectional view along line 2—2 of the scanner 10 shown in FIG. 1.

The scanning surface 16 comprises a thin material 32 having a thickness of 0.1 mm~0.3 mm stuck on it. The thin material 32 is stuck in front of the contacted portion 36 so that a groove 38 can be formed between the document 26 and scanning surface 16. The groove 38 is positioned under a line-shaped scanning position 34 above it. Comparing with the prior art sheet-fed scanner 10 shown in FIG. 1, the scanning position 34 of the scanner 40 is moved to the front of the contacted portion 36 instead of under it. The bottom of the groove 38 is transparent so that the light 28 emitted from the light source and the light 30 reflected from the document 26 can pass through it. When a photo picture 26 is carried through the scanning surface 16, since it is not possible for the photo picture 26 to contact the bottom of the groove 38, the viscous membrane on the picture surface of the photo picture 26 will not stick to the bottom of the groove 38 to interfere with the light 28 or 30. The blurred image problem caused by the sticking effect is thus solved.

However, when the photo picture 26 is carried through the contacted portion 36, the picture surface of the photo picture 26 still may get stuck to the scanning surface 16. To avoid such sticking effect, the contacted portion 36 can be coarse-textured to reduce the contacted area between the photo picture 26 and the contacted portion 36. Since the coarse-textured surface 42 contains many tiny air parcels in it, it can prevent the picture surface of the photo picture 26 from sticking to the scanning surface 36 so that the photo picture 26 can easily be carried through the contacted portion 36 by the roller 14.

Figure 5:
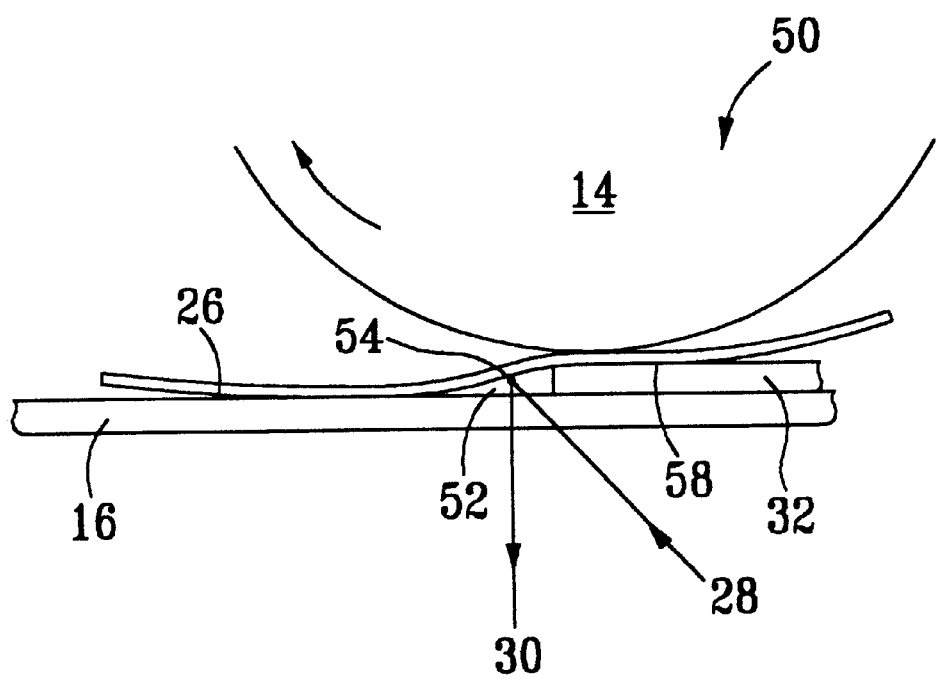
FIG. 5 is a sectional view of an alternative scanner according to the present invention which comprises a thin material installed below the roller.

Please refer to FIG. 5. FIG. 5 is part of a sectional view of a scanner 50 having a thin material 32 installed below the roller 14. The difference between the scanner 50 and the scanner 40 shown in FIG. 3 is that the scanner 50 has a thin material 32 installed between the scanning surface 16 and the roller 14. A groove 52 having a transparent bottom is formed behind the contacted portion 58 of the thin material 32 which is in contact with the roller 14. The groove 52 is positioned under a line-shaped scanning position 54. When the photo picture 26 is carried through the scanning position 54, it is not possible for the photo picture to contact the bottom of the groove 52 so that the blurred image problem caused by the sticking effect is avoided. A slightly coarse-textured surface can be made over the contacted portion 58 of the thin material 32 like the coarse-textured surface 42 shown in FIG. 4 to avoid the sticking effect. Furthermore, the groove 52 can be used to reduce the area covered in the contacted portion 58 to further reduce the friction between the photo picture 26 and the contacted portion 58.

Figure 6:
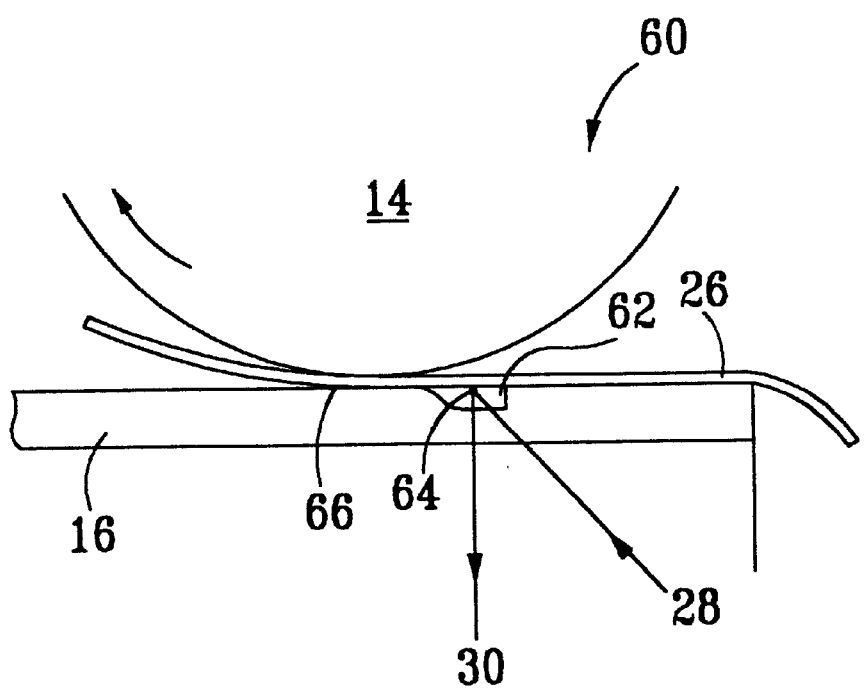
FIG. 6 is a sectional view of another scanner according to the present invention which comprises a groove installed in front of the contacted portion.

Please refer to FIG. 6. FIG. 6 is a sectional view of another scanner 60 according to the present invention. The difference between the scanner 60 and the scanner 40 shown in FIG. 3 is that the transparent groove 62 is made by carving the scanning surface 16 instead of using the thin material 32. The groove 62 is installed in front of a contacted portion 66 of the scanning surface 16 which is in contact with roller 14. It is positioned under a line-shaped scanning position 64. Like the coarse-textured surface 42 shown in FIG. 4, the contacted portion 66 can also be coarse-textured to avoid the sticking effect. Moreover, the groove 62 can also be used to reduce the area covered by the contacted portion 66 so that the friction between the document 26 and the contacted portion 66 can further be reduced.

Figure 7:
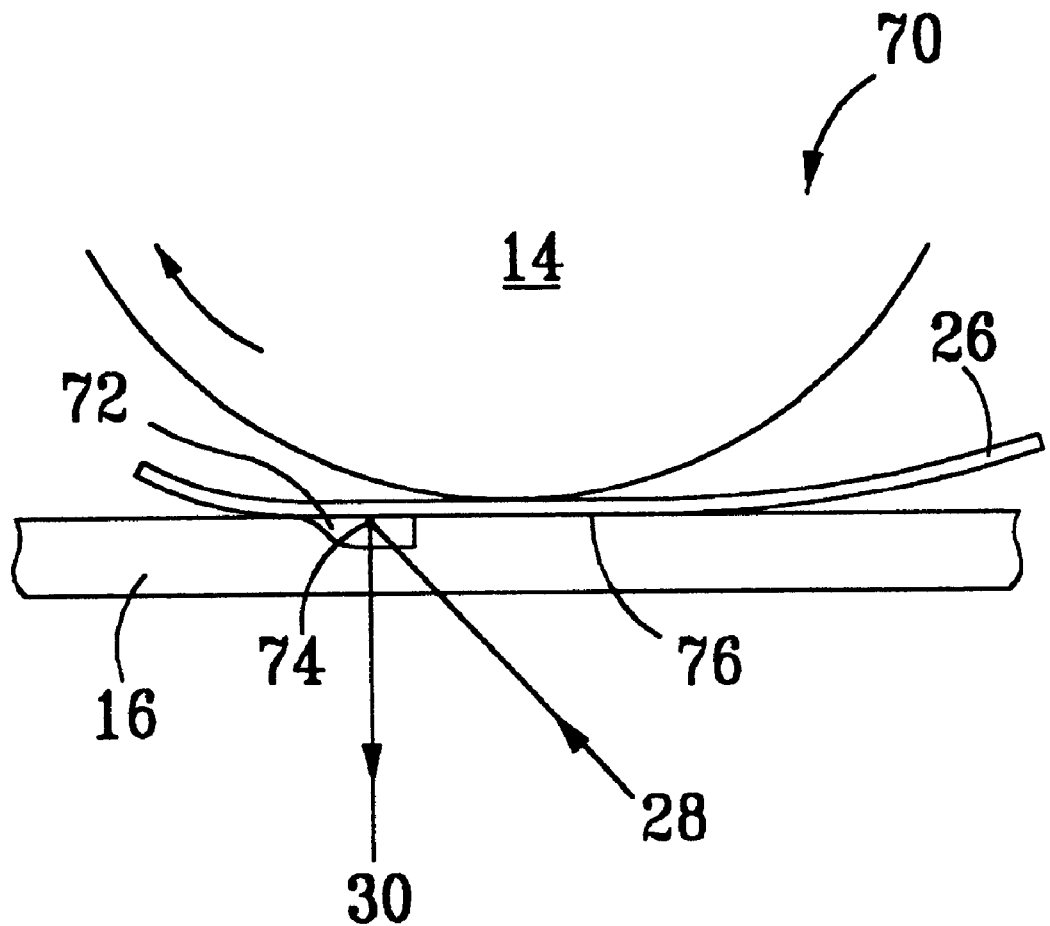
FIG. 7 is a sectional view of still another scanner according to the present invention which comprises a groove installed behind the contacted portion.

Please refer to FIG. 7. FIG. 7 is a sectional view of another scanner 70 according to the present invention. The difference between the scanner 70 and the scanner 60 shown in FIG. 6 is that a groove 72 is installed behind the contacted portion 76. The groove 72 is positioned under a line-shaped scanning position 74. Like the coarse-textured surface 42 shown in FIG. 4, the contacted portion 76 can also be coarse-textured to avoid the sticking effect. Moreover, the groove 72 can also be used to reduce the area covered by the contacted portion 76 so the friction between the document 26 and the contacted portion 76 can further be reduced.

The four scanners 40, 50, 60 and 70 shown above can all prevent the viscous membrane of a photo picture to stick to their contacted portions when scanning a photo picture. Quality and efficiency in scanning photo pictures can thus be greatly enhanced.

Those skilled in the art will readily observe that numerous modifications and alternations of the device may be made while retaining the teachings of the invention. Accordingly, the above disclosure should be constructed as limited only by the metes and bounds of the appended claims.

What is claimed is:

1. A scanner for scanning a document comprising:

an image pickup module comprising a housing having a scanning surface, a light source and an elongated light sensor installed inside the housing under the scanning surface, the scanning surface comprising a line-shaped scanning position parallel to the light sensor wherein when the document is carried through the scanning position, the light emitted from the light source will be reflected from the document over the scanning position and received by the light sensor;

a document roller rotatably mounted against the scanning surface of the image pickup module for carrying the document backward through the scanning position;

wherein the scanning surface further comprises a groove having a transparent bottom installed at the scanning position for allowing the light reflected from the document over the scanning position to pass through so as to scan the document whereby when the document is carried through the scanning position of the scanning surface, it will not be in contact with the transparent bottom of the groove wherein one side of the groove is formed by a first thin material, and the first thin material is stuck over the scanning surface to form the groove.

2. The scanner of claim 1 wherein the scanning surface further comprises a coarse-textured area in a contacted portion of the scanning surface which is in contact with the roller so as to avoid a document with viscous membrane stuck to the contacted portion when carried through the scanning surface.

3. The scanner of claim 2 wherein the coarse-textured area is provided by a second thin material stuck on the contacted portion of the scanning surface.

4. The scanner of claim 3 wherein the groove is positioned in front of or behind the thin material and one side of the groove is formed by the second thin material.

5. The scanner of claim 3 wherein the thickness of the second thin material is between 0.1 mm and 0.3 mm.

6. The scanner of claim 1 wherein the groove is installed in front of or behind the contacted portion of the roller.

7. The scanner of claim 6 wherein the groove is used to reduce the contacted portion of the roller so that the friction between the contacted portion and the document can be reduced.

8. The scanner of claim 1 wherein the thickness of the first thin material is between 0.1 mm and 0.3 mm.

* * * * *